United States Patent
Popovich (12)

(10) Patent No.: US 6,424,437 B1
(45) Date of Patent: Jul. 23, 2002

(54) PROJECTION DISPLAY EMPLOYING SWITCHABLE HOLOGRAPHIC OPTICAL ELEMENTS

(75) Inventor: Milan M. Popovich, Leicester (GB)

(73) Assignee: DigiLens, Inc., Sunnyvale, CA (US)

( * ) Notice: Subject to any disclaimer, the term of this patent is extended or adjusted under 35 U.S.C. 154(b) by 128 days.

(21) Appl. No.: 09/685,350

(22) Filed: Oct. 10, 2000

(51) Int. Cl.[7] .................................................. G02B 5/32
(52) U.S. Cl. ............................. 359/15; 357/22; 353/30; 353/34
(58) Field of Search .............................. 359/15, 22, 23; 353/30, 31, 34; 349/5, 6, 7, 8

(56) References Cited

U.S. PATENT DOCUMENTS

| | | |
|---|---|---|
| 3,807,829 A | 4/1974 | Close |
| 4,028,725 A | 6/1977 | Lewis ........................ 358/103 |
| 4,458,981 A | 7/1984 | Huignard |
| 4,500,163 A | 2/1985 | Burns et al. |
| 4,566,031 A | 1/1986 | Kirk |
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,938,568 A | 7/1990 | Margerum et al. ........... 350/334 |

(List continued on next page.)

FOREIGN PATENT DOCUMENTS

| | | | |
|---|---|---|---|
| DE | 34 19 098 A1 | 11/1985 | ............ G02B/27/22 |
| EP | 0 389 123 A2 | 9/1990 | ............ G03B/21/56 |
| EP | 0 389 123 A3 | 9/1990 | ............ G03B/21/56 |

(List continued on next page.)

OTHER PUBLICATIONS

International Search Report, PCT/US 00/28020.
IBM Technical Disclosure Bulletin, Interframe Multiplexed Video Projection Display, IBM Corp., New York, vol. 33, No. 2, Jul. 1, 1990.

*Primary Examiner*—Cassandra Spyrou
*Assistant Examiner*—Leo Boutsikaris
(74) *Attorney, Agent, or Firm*—Skjerven Morrill LLP

(57) ABSTRACT

The present invention relates to an optical system for use in a projection display system. The optical system, in one embodiment, includes a first electrically switchable holographic optical element (ESHOE) and a light deflector. The first ESHOE operates between active and inactive states and includes oppositely facing front and back surfaces. In the inactive state, the first ESHOE transmits first bandwidth light received on the front surface without substantial alteration. In the active state, the first ESHOE diffracts first bandwidth light received on the front surface, the diffracted first bandwidth light emerging also from the front surface. The light deflector receives first bandwidth light diffracted by the first ESHOE. In response, the light deflector deflects this diffracted first bandwidth light. The first ESHOE and the light deflector are positioned such that first bandwidth light transmitted through the inactive first ESHOE without substantial alteration can illuminate a first surface area while first bandwidth light diffracted by the active first ESHOE and subsequently deflected by the light deflector can illuminate a second non-overlapping.

22 Claims, 9 Drawing Sheets

U.S. PATENT DOCUMENTS

| | | |
|---|---|---|
| 4,981,332 A | 1/1991 | Smith et al. |
| 4,993,790 A | 2/1991 | Vick |
| 5,011,244 A | 4/1991 | Smith et al. |
| 5,013,141 A | 5/1991 | Sakata ........................ 350/348 |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,093,567 A | 3/1992 | Staveley ..................... 250/221 |
| 5,096,282 A | 3/1992 | Margerum et al. .............. 359/3 |
| 5,103,323 A | 4/1992 | Magarinos |
| 5,111,313 A | 5/1992 | Shires |
| 5,151,724 A | 9/1992 | Kikinis |
| 5,153,621 A * | 10/1992 | Vogeley ....................... 353/30 |
| 5,153,670 A | 10/1992 | Jannson et al. |
| 5,175,637 A | 12/1992 | Jones et al. ................... 359/48 |
| 5,221,957 A | 6/1993 | Jannson et al. |
| 5,227,898 A | 7/1993 | Iavecchia et al. |
| 5,234,449 A | 8/1993 | Bruker ....................... 606/158 |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,331,149 A | 7/1994 | Spitzer et al. .............. 250/221 |
| 5,341,229 A | 8/1994 | Rowan |
| 5,365,354 A | 11/1994 | Jannson et al. |
| 5,379,133 A | 1/1995 | Sharp et al. |
| 5,414,544 A | 5/1995 | Aoyagi et al. ................ 359/53 |
| 5,418,631 A | 5/1995 | Tedesco et al. |
| 5,424,866 A | 6/1995 | Kikinis et al. |
| 5,440,428 A | 8/1995 | Hegg et al. |
| 5,455,693 A | 10/1995 | Wreede et al. ................ 359/15 |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,579,026 A | 11/1996 | Tabata .......................... 345/8 |
| 5,581,378 A | 12/1996 | Kulick |
| 5,589,956 A | 12/1996 | Morishima et al. ........... 359/15 |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,635,947 A | 6/1997 | Iwamoto ....................... 345/7 |
| 5,640,256 A | 6/1997 | De Vré et al. ................. 359/3 |
| 5,644,369 A | 7/1997 | Jachimowicz et al. ........ 349/10 |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,682,214 A | 10/1997 | Amako et al. ................ 349/74 |
| 5,684,498 A | 11/1997 | Welch et al. ................... 345/8 |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,731,853 A * | 3/1998 | Taketomi ..................... 359/15 |
| 5,736,958 A | 4/1998 | Turpin |
| 5,739,930 A | 4/1998 | Sato et al. |
| 5,744,267 A | 4/1998 | Meerholz et al. |
| 5,745,203 A | 4/1998 | Valliath et al. |
| 5,748,272 A | 5/1998 | Tanaka et al. ................ 349/86 |
| 5,748,828 A | 5/1998 | Steiner et al. |
| 5,751,243 A | 5/1998 | Turpin |
| 5,751,452 A | 5/1998 | Tanaka et al. ................ 359/52 |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,768,242 A | 6/1998 | Juday ......................... 369/103 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Louiseaux et al. |
| 5,790,284 A | 8/1998 | Taniguchi et al. |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A | 9/1998 | Chen et al. |
| 5,801,799 A | 9/1998 | Chen et al. |
| 5,808,589 A | 9/1998 | Fergason ....................... 345/8 |
| 5,808,759 A | 9/1998 | Okamori et al. |
| 5,808,800 A | 9/1998 | Handschy et al. .......... 359/630 |
| 5,815,222 A | 9/1998 | Matsuda et al. |
| 5,822,029 A | 10/1998 | Davis et al. |
| 5,825,340 A | 10/1998 | Torizuka et al. ............... 345/8 |
| 5,825,448 A | 10/1998 | Bos et al. |
| 5,825,540 A | 10/1998 | Gold et al. |
| 5,828,471 A | 10/1998 | Davis et al. |
| 5,838,403 A | 11/1998 | Jannson et al. |
| 5,844,709 A | 12/1998 | Rabinovich et al. |
| 5,844,711 A | 12/1998 | Harrison |
| 5,852,504 A | 12/1998 | Kato et al. |
| 5,867,134 A | 2/1999 | Alvelda et al. ................. 345/8 |
| 5,875,012 A | 2/1999 | Crawford et al. ............. 349/74 |
| 5,880,883 A | 3/1999 | Sudo .......................... 359/462 |
| 5,886,675 A | 3/1999 | Aye et al. ....................... 345/7 |
| 5,942,157 A | 8/1999 | Sutherland et al. |
| 5,959,704 A | 9/1999 | Suzuki et al. ................... 349/9 |
| 5,977,935 A | 11/1999 | Yasukawa et al. ............. 345/8 |
| 6,008,781 A | 12/1999 | Furness, III et al. ............ 345/8 |
| 6,023,253 A | 2/2000 | Taniguchi et al. .............. 345/7 |
| 6,082,862 A * | 7/2000 | Popovich ..................... 359/15 |
| 6,101,008 A | 8/2000 | Popovich ..................... 359/15 |
| 6,175,431 B1 * | 1/2001 | Waldern ...................... 359/15 |

FOREIGN PATENT DOCUMENTS

| | | | |
|---|---|---|---|
| EP | 0 421 628 A2 | 4/1991 | ........... G03B/21/00 |

| | | | | | | | | |
|---|---|---|---|---|---|---|---|---|
| EP | 0 559 435 A1 | 9/1993 | ........... G11B/7/135 | EP | 0 856 766 A3 | 7/1999 | ......... G02F/1/1333 |
| EP | 0 602 813 A1 | 6/1994 | ........... D02B/5/32 | EP | 0 856 768 A3 | 8/1999 | ......... G02F/1/1347 |
| EP | 0 664 495 A1 | 7/1995 | ........... G03H/1/02 | FR | 2 610 733 A1 | 12/1988 | ........... G02B/27/10 |
| EP | 0 720 040 A2 | 7/1996 | ......... G02F/1/1335 | GB | 2 259 213 A | 3/1993 | ............ G08B/9/32 |
| EP | 0 720 040 A3 | 4/1997 | ......... G02F/1/1335 | JP | 3-84516 | 4/1991 | ......... G02B/27/22 |
| EP | 0 777 136 A1 | 6/1997 | ........... G02B/5/20 | JP | 10 54959 | 2/1998 | ......... G02B/27/42 |
| EP | 0 785 457 A2 | 7/1997 | ......... G02F/1/1333 | WO | WO 94/18596 | 8/1994 | ........... G02B/27/00 |
| EP | 0 821 293 A2 | 1/1998 | ........... G03H/1/04 | WO | WO 95/04294 | 2/1995 | |
| EP | 0 825 462 A1 | 2/1998 | ........... G02B/5/32 | WO | WO 97/35223 | 9/1997 | ........... G02B/27/01 |
| EP | 0 826 986 A1 | 3/1998 | ........... G02B/5/20 | WO | WO 97/36206 | 10/1997 | ......... G02F/1/1347 |
| EP | 0 856 766 A2 | 8/1998 | ......... G02F/1/1333 | WO | 98/04650 | 2/1998 | |
| EP | 0 856 768 A2 | 8/1998 | ......... G02F/1/1347 | WO | 00/28369 | 5/2000 | ........... G02B/27/01 |
| EP | 0 785 457 A3 | 10/1998 | ......... G02F/1/1333 | | | | |
| EP | 0 821 293 A3 | 11/1998 | ............ G03H/1/04 | * cited by examiner | | | |

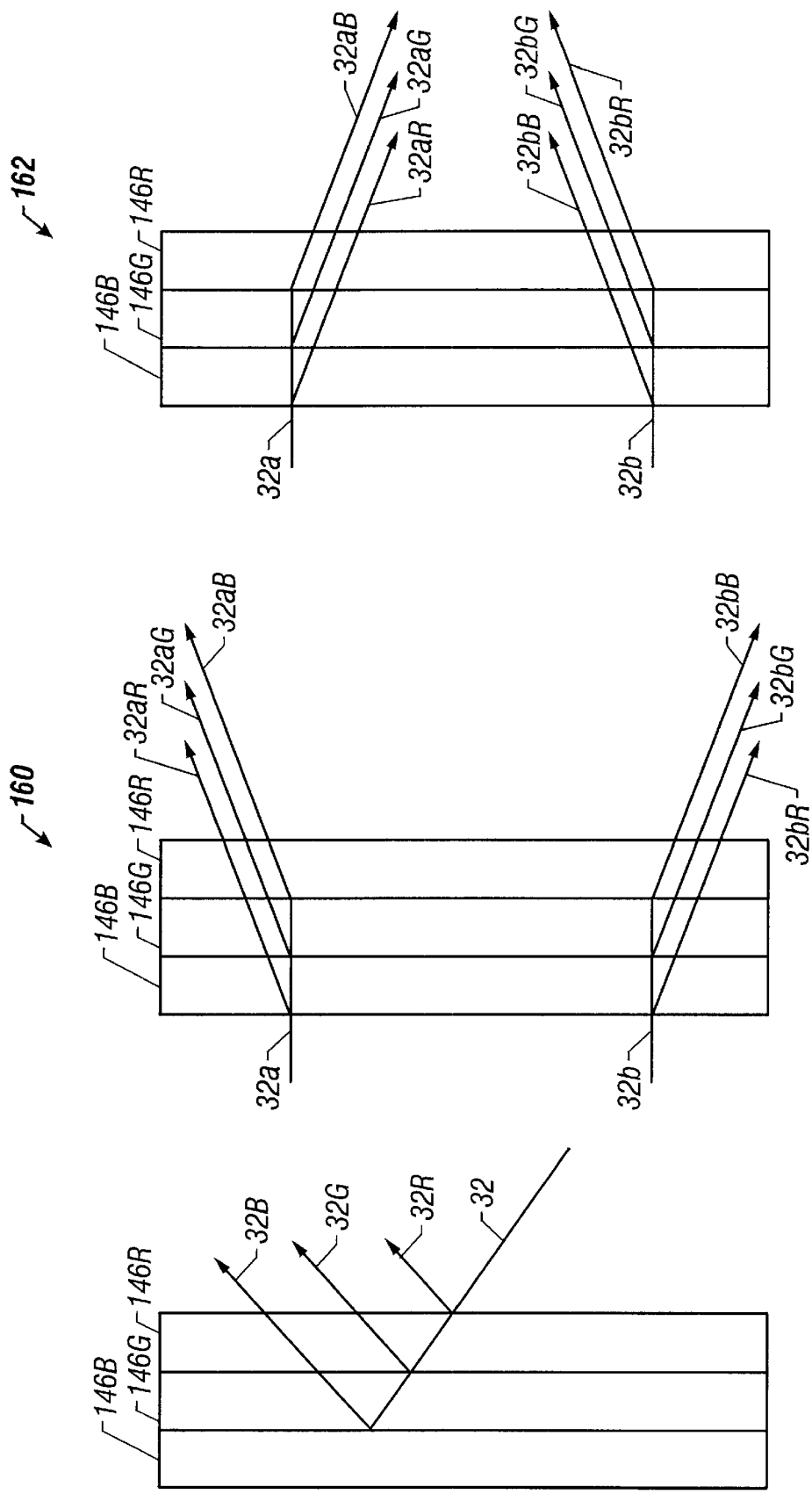

PROJECTION DISPLAY EMPLOYING SWITCHABLE HOLOGRAPHIC OPTICAL ELEMENTS

RELATED APPLICATIONS

This application claims priority to a U.S. Provisional Application Ser. No. 60/255,671 entitled "Projection Display." The provisional application was filed Oct. 8, 1999.

BACKGROUND OF THE INVENTION

1. Field of the Invention

The present invention relates generally to projection display systems. More particularly, the present invention relates to a projection display system employing one or more electrically switchable holographic optical elements (ESHOEs).

2. Description of the Related Art

Projection display systems operate to display an image or a sequence of images onto a screen. Projection displays can be employed in numerous systems. For example, projection displays can be employed to display images created by a laptop or desktop computer systems.

Projection systems typically include a projector and a screen for receiving projected images from the projector. The projector and the screen may operate to display a color image formed, for example, by projecting three monochromatic image components of the color image onto the screen. The projector may comprised of an image generator and projection optics. The image generator may contain a light source that provides white illumination light to an input image display panel. As an example, the input image display panel may be a reflective liquid crystal display (LCD) panel which is illuminated by the light from the light source. The display panel generates the image components that are to be projected onto the screen.

SUMMARY OF THE INVENTION

The present invention relates to an optical system for use in a projection display system. The optical system, in one embodiment, includes a first electrically switchable holographic optical element (ESHOE) and a light deflector. The first ESHOE operates between active and inactive states and includes oppositely facing front and back surfaces. In the inactive state, the first ESHOE transmits first bandwidth light received on the front surface without substantial alteration. In the active state, the first ESHOE diffracts first bandwidth light received on the front surface, the diffracted first bandwidth light emerging also from the front surface. The light deflector receives first bandwidth light diffracted by the first ESHOE. In response, the light deflector deflects this diffracted first bandwidth light. The first ESHOE and the light deflector are positioned such that first bandwidth light transmitted through the inactive first ESHOE without substantial alteration can illuminate a first surface area while first bandwidth light diffracted by the active first ESHOE and subsequently deflected by the light deflector can illuminate a second non-overlapping.

The projection display system employing the optical system described above, can also include an image generator (also known as an input image display panel) and a display screen. The image generator may take form in any one of several arrangements. For example, the image generator could be any type of high light output display such as a color sequentially illuminated reflective LCD. Alternatively, the image display may include a set of three separately illuminated red, green, and blue reflective LCD display panels. Employing a set of three separately illuminated red, green, and blue reflective LCD display panels is advantageous in that it avoids the problem of color break up and provides better light throughput than a single LCD image generator. Further, the image generator may take form in one or more laser scanning devices which output one or more laser beams modulated in accordance with a sequence of image signals. These modulated laser beams scan a display surface area in raster like fashion when displaying an image frame. The display screen may include first and second panels which include the first and second surface areas, respectively, mentioned above. The display panels may be capable of rotation around a common axis.

In another embodiment, the optical system may include second and third ESHOEs in communication with the first ESHOE. The second and third ESHOEs may include oppositely facing front and back surfaces. Like the first ESHOE, the second and third ESHOEs operate between active and inactive states. In the active state, the second and third ESHOEs transmit second and third bandwidth light, respectively, received on their respective front surfaces. The second and third ESHOEs transmit second and third bandwidth light, respectively, without substantial alteration while operating in the inactive state. The second and third ESHOEs diffract second and third bandwidth light, respectively, received on a respective front surfaces when operating in the active state. In contrast to the inactive mode, second and third bandwidth light received and diffracted by the second and third ESHOEs, respectively, emerge from respective front surfaces thereof.

The light deflector may be positioned to receive the second and third bandwidth lights diffracted by the second and third ESHOEs, respectively. The light deflector may be configured to deflect the second and third bandwidth lights onto the second surface area. Further, second and third bandwidth lights transmitted through inactive second and third ESHOEs, respectively, without substantial alteration, can illuminate the first surface area.

The light deflector may take form in any one of several embodiments including a conventional mirror, a static holographic optical element, or an ESHOE. The light deflector embodied within an ESHOE operates between active and inactive states. In the active state, ESHOE diffracts one or more different bandwidths of visible light. In the inactive state, this ESHOE transmits substantially all light incident thereon without substantial alteration.

BRIEF DESCRIPTION OF THE DRAWINGS

The present invention may be better understood, and it's numerous objects, features and advantages made apparent to those skilled in the art by referencing the accompanying drawings. The use of the same reference number throughout the Figures designates a like or similar element.

FIGS. 9–11 are schematic diagrams of ESHOEs which may be employed in the optical systems of FIGS. 1–6B.

Figure 1:
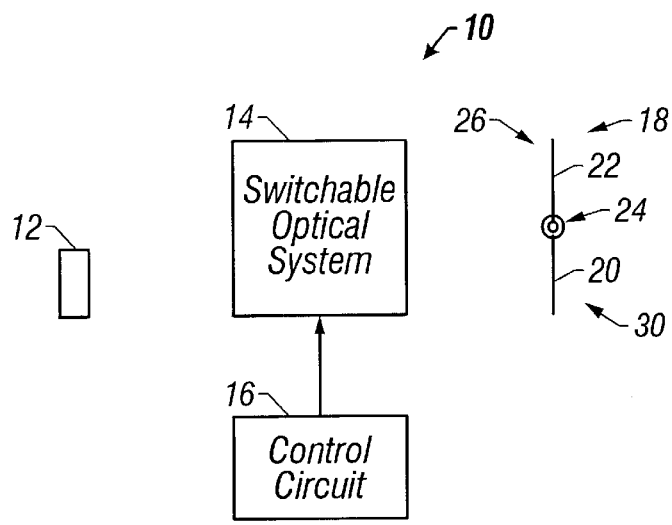
FIG. 1 is a schematic diagram of a projection display system employing the present invention.

While the invention is susceptible to various modifications and alternative forms, specific embodiments thereof are shown by way of example in the drawings and will herein be described in detail, it should be understood, however, that the drawings and detailed description thereto are not intended to limit the invention to the particular form disclosed but on the contrary, the intention is to cover all modifications, equivalents, and alternatives falling within the spirit and scope of the present invention as defined by the appended claims.

DETAILED DESCRIPTION

The present invention finds particular application in any one of a number of projection systems including desktop computer projection displays for displaying multiple computer generated images. The present invention should not be limited to desktop computer system projection displays.

Desktop computer projection displays may include a screen, the left half of which can be used as a main data display area while the right half can be used for displaying notes and backup information. Both halves of this screen can share the maximum resolution and brightness available from an image input display of the projection system.

FIG. 1 a schematic diagram illustrating a projection display system 10 employing the present invention. Projection display system 10 includes an image input display panel or image generator 12, switchable optical system 14, control circuit 16, and display screen 18. The image generator 12, switchable optical system 14, and display screen 18 are shown from a top view.

Display screen 18 includes first (or left) and second (or right) display panels 20 and 22, respectively, which may be capable of rotation around a common axis. For example, display panel 20 may be rotatably connected about common axis 24 via a hinge mechanism. It is noted that within FIG. 1, display screen 18 includes adjacent display panels 20 and 22 which are designed to receive left and right components of a composite image. The present invention should not be limited thereto. Rather, display screen 18 may include three or more display panels, each of which is designed to receive a respective component of a composite image.

Figure 2A:
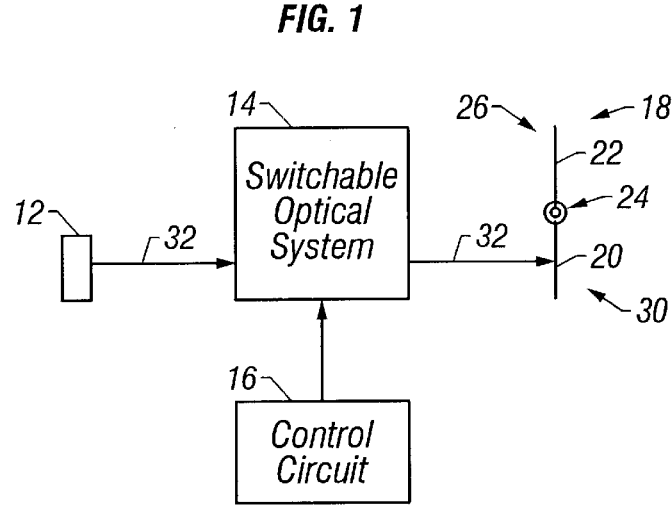
FIGS. 2A and 2B illustrate operational aspects of the projection display system shown FIG. 1.
Figure 2B:
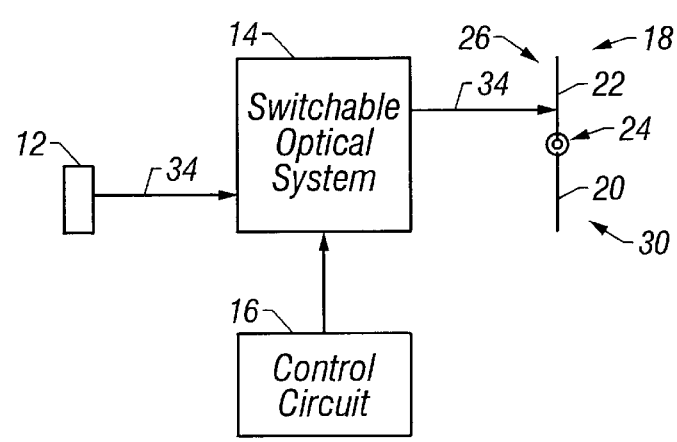

FIGS. 2A and 2B illustrate operational aspects of the projection system 10 shown in FIG. 1. Image generator 12, in one embodiment, generates left and right composite image components which are ultimately projected onto or otherwise displayed on display panels 20 and 22, respectively, via switchable optical system 14. FIGS. 2A and 2B illustrate system 10 as the left and right components of the composite image are displayed on display panels 20 and 22 respectively. The projection system 10 shown in FIG. 1 may be embodied in either a front or rear projection display system. FIG. 1 shows a rear projection display system in which components of the composite image are displayed on a front surface 26 of display screen 18 but viewed by a user looking at the back surface 30. In a front projection display system, component images of a composite will be displayed on the same surface of display screen 18 seen by the user.

In FIG. 2A, image generator 12 generates a left component image of the composite image. Light 32 of the left component image is received by optical system 14 which is coupled to control circuit 16. In response to one or more first control signals generated by control circuit 16, optical system 14 transmits all or substantially all of left component light 32 without substantial alteration. Light 32 is received by display panel 20 so that the left component image of the composite image is displayed on display panel 20. In FIG. 2B, image generator 12 generates the right component image of the composite image. Light 34 of the right component image is received by optical system 14. In response to one or more second control signals generated by control circuit 16, optical system 14 redirects some or all of right component light 34 onto display panel 22. Accordingly, the left and right components of a composite image are displayed for view on display panels 20 and 22, respectively.

Image generator 12 may be any type of light output display including, but not limited to, a color sequentially illuminated reflective liquid crystal display (LCD). Alternatively, image generator 12 may be replaced by three separately illuminated red, green and blue reflective LCD display panels, this alternative embodiment being preferred since it avoids the problem of color break up and offers better light throughput when compared to a single LCD embodiment. Alternatively, image generator 12 maybe embodied within one or more laser scanning devices. The components of the composite image should be generated by image generator 12 and subsequently displayed on display panels 20 and 22 at a display frame rate of at least 85 Hz. Preferably, the component images are generated by generator 12 such that the display frame rate on each of the display panels 20 and 22, is 100 Hz or greater. Where image generator 12 is divided into three separate red, green, and blue input image display panels, each of the latter would require a frame rate of at least 200 Hz.

Figure 3A:
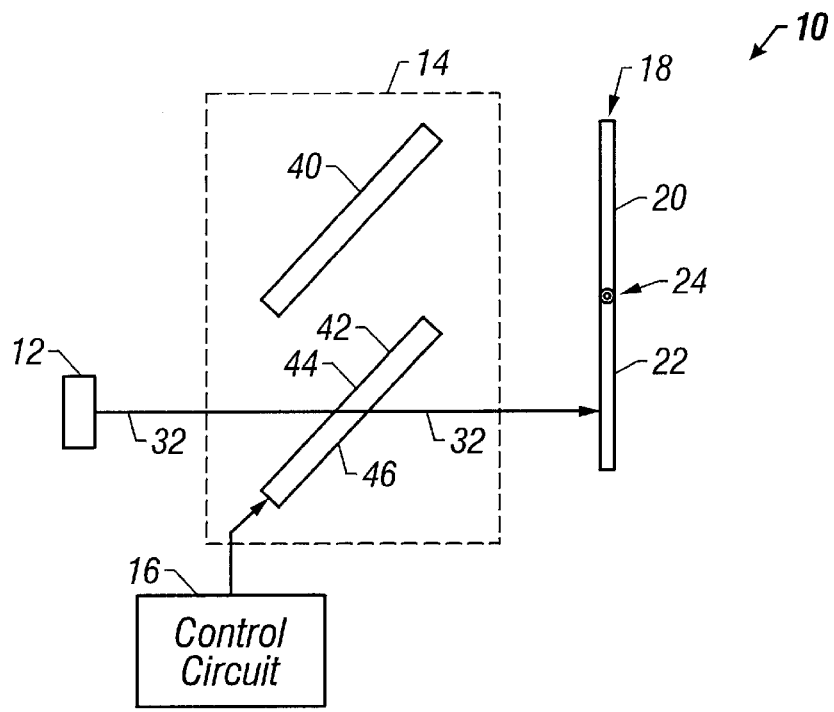
FIGS. 3A and 3B illustrational aspects of one embodiment of the projection system shown in FIG. 1.
Figure 3B:
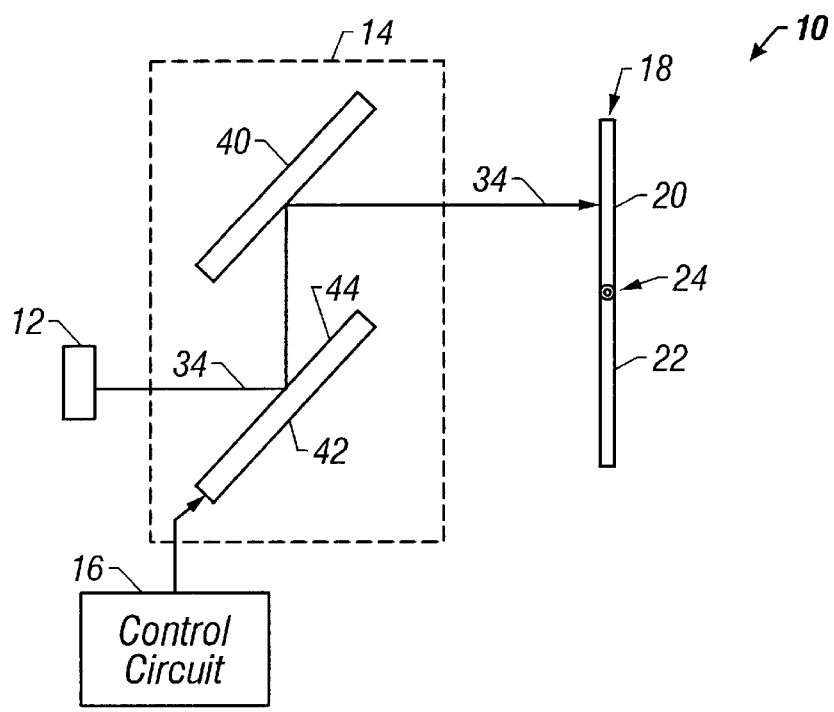

FIGS. 3A and 3B show operational aspects of one embodiment of the projection display system shown in FIG. 10. The switchable optical system 14 of FIGS. 3A and 3B include a light deflector 40 and one or more ESHOEs coupled to control circuit 16. Again, FIGS. 3A and 3B show a top view of the projection system 10 as optical system 14 receives left and right image component lights 32 and 34, respectively.

ESHOE system 42 may include one or more ESHOEs which will be described more fully below. ESHOE system 42, in one embodiment, operates between the active and inactive states in accordance with control signals generated by control circuit 16. ESHOE system 42, shown in cross section, includes a front surface 44 and an oppositely facing back surface 46. As shown in FIG. 3A, when ESHOE system 42 is in the inactive state, all or substantially all of left component image light 32 received on front surface 44 is transmitted through without substantial alteration. In contrast, as shown in FIG. 3B, all or substantially all of right image component light 34 received on front surface 44 is deflected by ESHOE system 42. The deflected light emerges from front surface 44 and is subsequently received by deflector 40. It is noted that the ESHOE(s) of optical system 42 diffract image light 34 when active, the diffracted light emerging from the same surface (44) on which image light 34 is received. If the ESHOE(s) of optical diffract image light 34 with perfect efficiency, then all of the image light 34 would be deflected to deflector 40. Generally, some of image light 34 diffracted by the activated ESHOE(s) may be contained in orders which are not received by deflector 40, or may be contained in zero order light that transmits through the activated ESHOE(s). However, if the ESHOE(s) diffraction efficiency is great enough, the effects of the zero order light and other diffraction order light not properly received by the deflector will be negligible when seen by a viewer. Conversely, when the ESHOE(s) are inactive, some small percentage of the left image component light 32 may be diffracted resulting in less than 100% transmission of image light 32 through the ESHOE(s) without substantial alteration. Again, these effects will be negligible when the user views the images projected onto panel 22.

In FIG. 3A, when ESHOE system 42 operates in the inactive state, and ESHOE system behaves as a light transparent plate which allows image light 32 to pass substantially unaltered to display panel 22. In the active state, as shown in FIG. 3B, ESHOE system 42 behaves a mirror reflecting right image component light 34 to light deflector 40. Light deflector 40 also behaves as a mirror and reflects right component image light 34 onto image panel 20. Light deflector 40 may take form in a conventional mirror. Alternatively, light deflector 40 may take form in one or more static holographic optical elements. Further, light deflector 40 may take form in one or more ESHOEs controlled with signals generated by control circuit 16. Where light deflector 40 takes form in a static holographic optical element or one or more ESHOEs, lateral beam displacement resulting from the finite thickness of substrates, more fully described below, in the ESHOE system 42 can be corrected.

As noted above, ESHOE system 42 may take form in one or more ESHOEs. ESHOE system 42 may be referred to herein as switchable holographic mirror 42. Ideally, ESHOE system 42 is designed to operate as a specular reflector, i.e., having Bragg fringes parallel to the front surface 44. This embodiment advantageously eliminates chromatic dispersion. The use of a planar Bragg fringe geometry also eliminates chromatic dispersion. The use of a planar Bragg fringe geometry also eliminates monochromatic geometrical optical aberrations, including coma and astigmatisms.

Figure 4A:
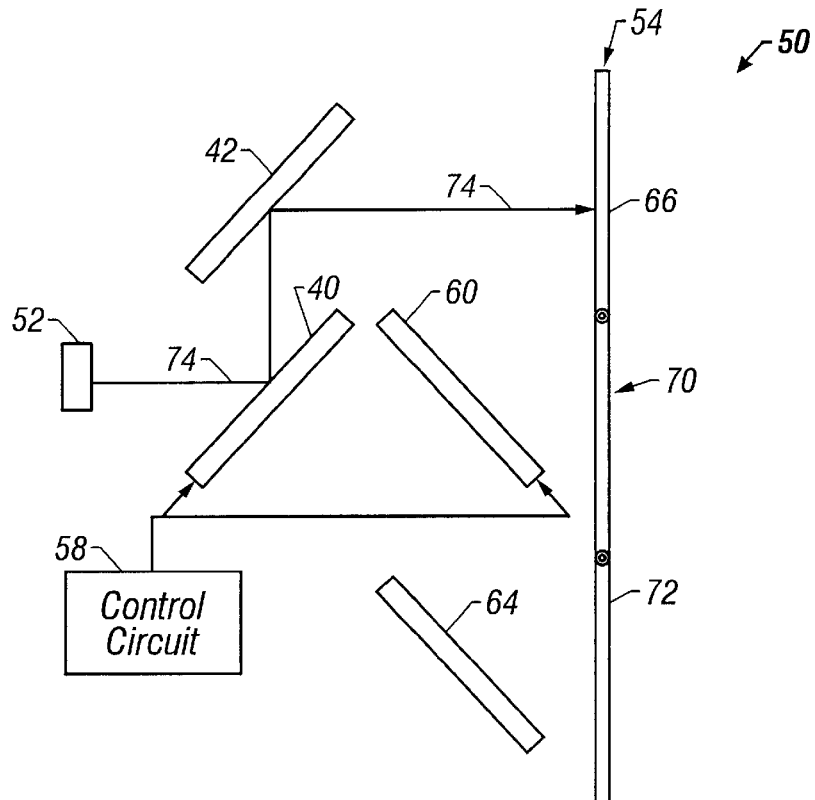
FIGS. 4A–4C illustrate operational aspects of another embodiment of the projection display system employing the present invention.
Figure 4B:
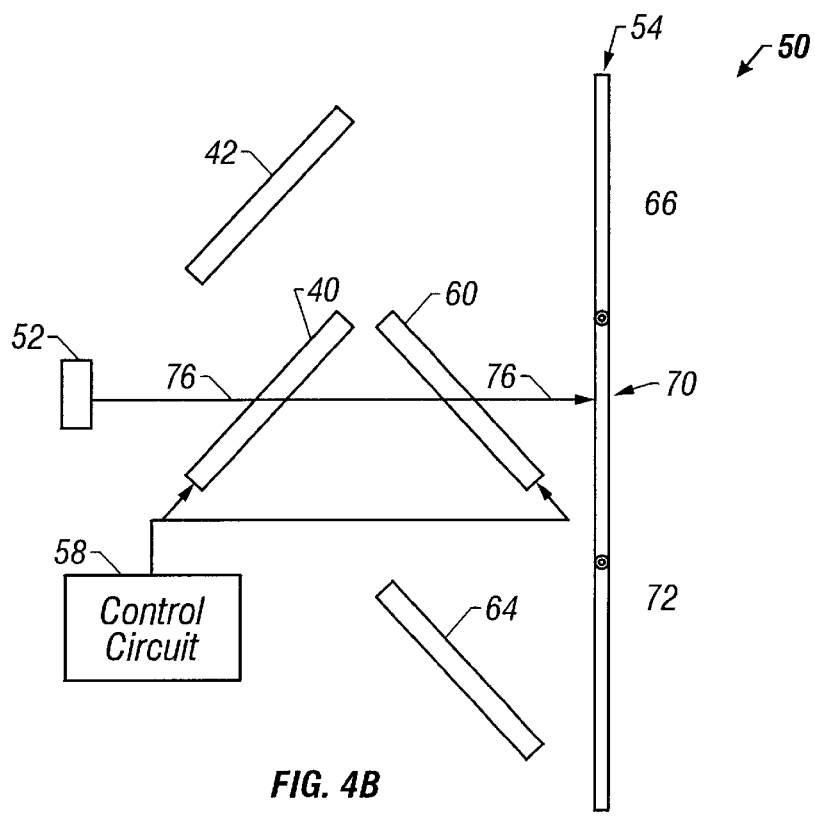
Figure 4C:
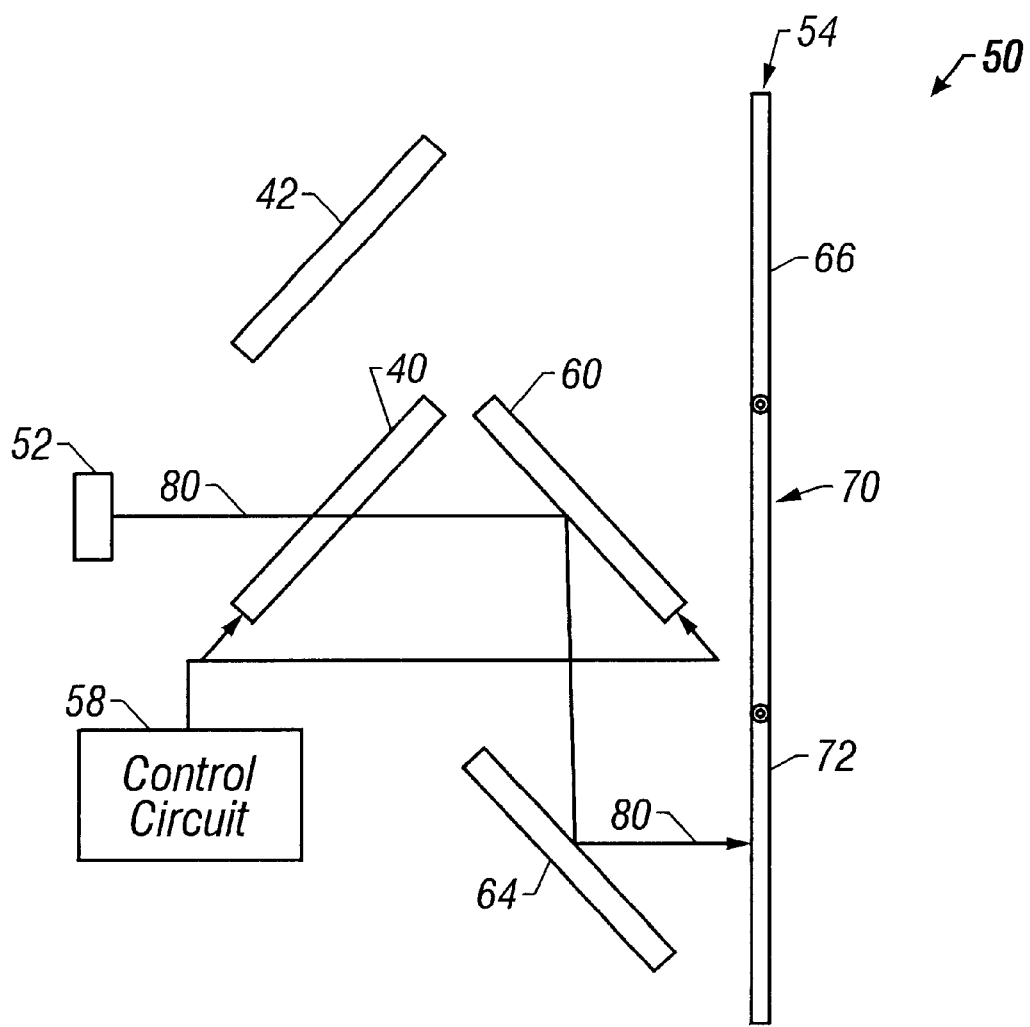

FIGS. 4A–4C illustrate operational aspects of an alternative projection system 50 employing the present invention. System 50 shown in FIGS. 4A–4C include components of the projection display system 10 of FIGS. 3A and 3B. Projection display system 50 shown in FIGS. 4A–4C includes an image generator 52 for generating right, middle and left component images of a composite image, a display screen 54, first and second ESHOE systems 42 and 60, respectively, control circuit 58, and first and second light deflectors 42 and 64, respectively. Display screen 54 may include three separate display panels 66, 70, and 72, respectively, which may be joined rotatably at common axes therebetween. The projection display system 50 shown in FIGS. 4A–4C may embody a rear projection system, it being understood that a front projection display system of similar type is also contemplated.

The projection system 50 shown in FIGS. 4A–4C operate similarly to that shown in FIGS. 3A–3B. In FIG. 4A, control circuit 58 activates first ESHOE system 40 while deactivating second ESHOE system 60. Concurrently, image generator 52 generates the right component image, light 74 of which is received by activated first ESHOE system 40. All or substantially all of image light 74 is diffracted to first light deflector 42. Image light 74, after being deflected by light deflector 42, is received on front surface of panel 66 such that panel displays the right image component.

In FIG. 4B, control circuit 58 deactivates first ESHOE system 40 while maintaining second ESHOE system 60 in the inactive state as image generator 52 projects the middle image component of the composite image. Light 76 of this middle image component is received and subsequently transmitted through both inactive first and second ESHOE systems 40 and 60 without substantial alteration and falls incident on a front surface of display panel 70. In FIG. 4C, control circuit 58 activates second ESHOE system 60 while maintaining first ESHOE system 40 in the inactive state as image generator 52 generates the left component image of the composite image. Left component image light 80 is transmitted through deactivated first ESHOE system 40 without substantial alteration and is received by the front surface of ESHOE system 60. Second ESHOE system 60, in turn, diffracts image light 80 toward second light deflector 64 which, in turn, deflects light 80 onto the front surface of panel 72.

FIGS. 4A–4C represent the first, second, and third stages, respectively, of a three-stage repeated cycle. In one embodiment, first and second ESHOE systems are identical with each other. Additionally, first and second light deflectors 42 and 64 respectively, may be identical to each other in structure.

Figure 5:
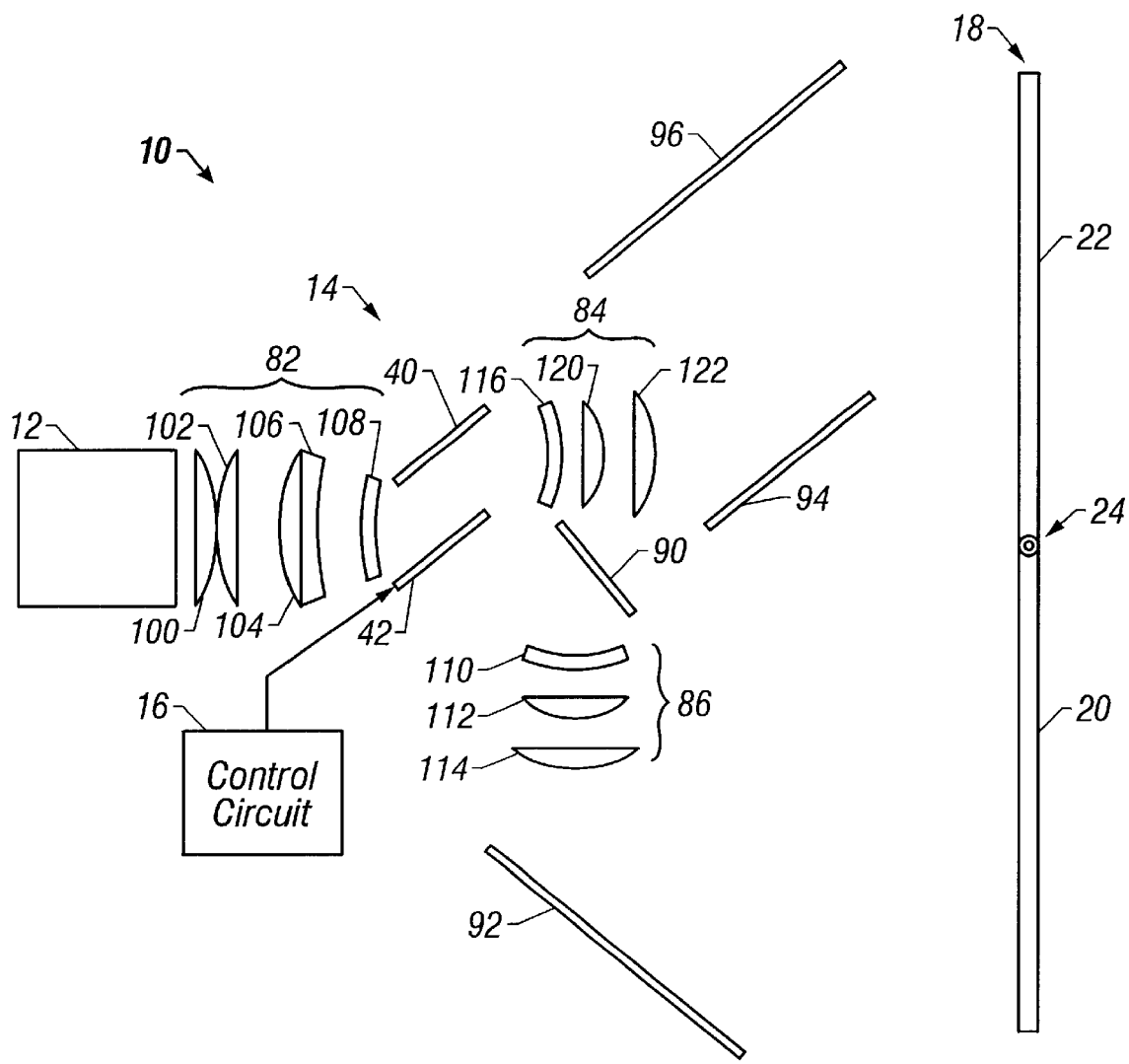
FIG. 5 is a schematic-diagram of a another embodiment of the projection display system shown in FIG. 1.

FIG. 5 shows an alternative arrangement of the projection display system 10 shown in FIG. 1. In FIG. 5, optical system 14 includes lens groups 82–86 and light deflectors 90–96 in addition to, light deflector 40 and ESHOE system 42,. Light deflectors 90–96 may be embodied in conventional mirrors, static holographic optical elements, or ESHOEs. However, light deflectors 90–96 in FIG. 5 will be described as being formed from conventional mirrors. Likewise, lens groups 82–86 may be embodied in conventional optical components, static holographic optical elements, ESHOEs, or a combination thereof. Exemplary ESHOE embodied optical components for use in lens groups 82–86 are described in U.S. application Ser. No. 09/351,412 filed Jul. 9, 1999 and entitled, "Projection System Based On Reconfigurable Holographic Optics" which is incorporated herein by reference in entirety. For the purposes of explanation, lens groups 82–86 will consist of conventional optical components such as glass converging or diverging lenses.

Lens groups 84 and 86 may be designed to magnify and project the images generated by image generator 12 before the images are received by panels 20 and 22. Lens group 82 may be designed to reduce the beamed divergence as much as possible at an aperture of ESHOE system 42. Preferably, the beamed divergence at this aperture is zero which ensures that ESHOE system 42 has optimum optical efficiency. The lens groups 82–86 may also be designed to ensure a minimal gap or overlap between the left and right image components as they are projected on display panels 20 and 22, respectively. It is noted that panels 20 and 22 can be rotated about their common axis toward the viewer regardless of whether the projection display system 10 takes form in a front or rear projection display system.

Lens groups 82–86 and mirrors 90 and 96 may facilitate a more compact image generator 12 or optical system 14. More particularly, the combination of lens groups and/or mirrors 90–96 may be used to expand or magnify the left and right component images such that they fill all or substantially all of the display panels front surface area. It is noted that the conventional optics within the lens groups 82–86 may be replaced to further magnify the left and right component images to accommodate display screen having different front surface areas within display panels 20 and 22.

Figure 6A:
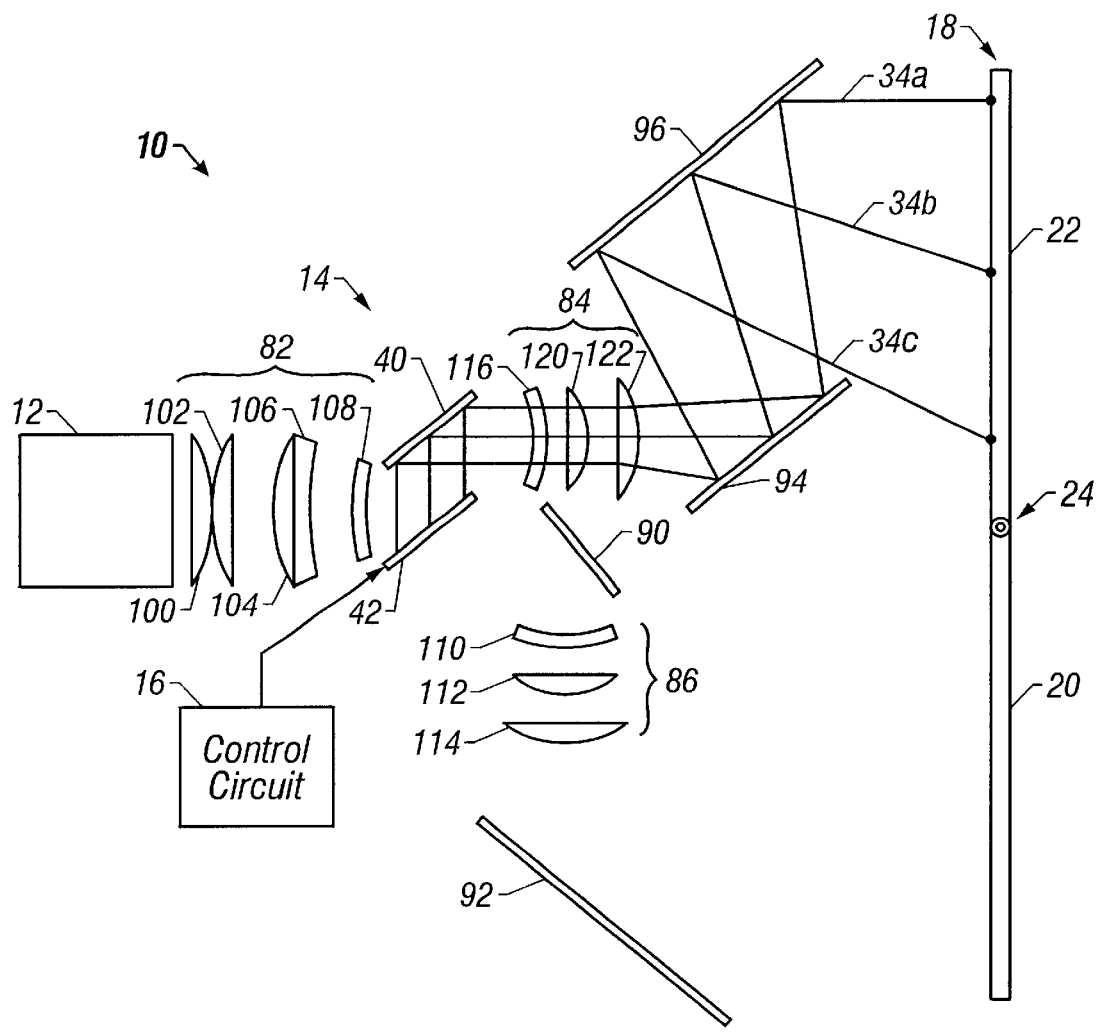
FIGS. 6A and 6B illustrate operational aspects of the display projection system shown in FIG. 5.
Figure 6B:
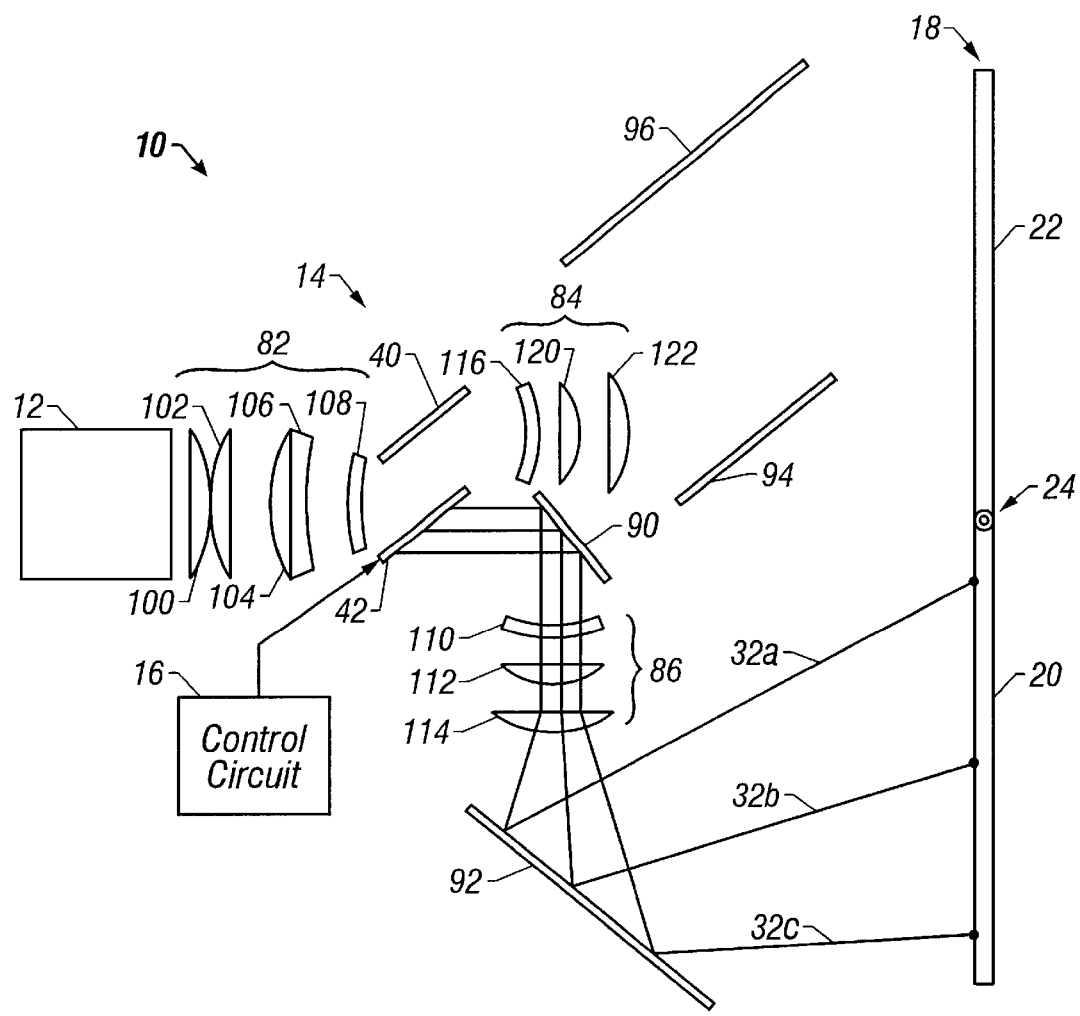

FIGS. 6A and 6B illustrate operational aspects of the projection system 10 shown in FIG. 5. More particularly, FIG. 6B illustrates operational aspects of the projection display system 10 when image generator 12 generates the left component image while ESHOE system 42 is rendered inactive by control circuit 16. Light 32 (which includes beams 32a–32c) of the left image component passes through lens group 82 prior to being received on the front surface of ESHOE system 42. Lens group 82 is provided so that the beam divergence at the aperture of the ESHOE system 42 is as small as possible and preferably zero. Because the ESHOE system 42 is in the inactive state, image light 32 is transmitted therethrough to emerge from the back surface of the ESHOE system 42 without substantial alteration before being received and reflected by mirror 90. hnage light 32 is subsequently transmitted through and magnified by lens group 86 before being received and reflected by mirror 92. FIG. 6B shows beams 32a and 32c diverging to represent the magnification operation of lens group 86. Magnified image light 32 is ultimately received on a front surface of display panel 20 after being reflected by mirror 92. Using lens group 86 shown in FIG. 6B, a small image generated by image generator 22 can be magnified to fit upon a large surface area of panel 20. In FIG. 6A, control circuit 16 activates ESHOE system 42 while image generator 12 generates the right component of the composite image. Light 34 (which includes beams 34a through 34c) of the right component passes through lens group 82 before being received by ESHOE system 42. Because ESHOE system 42 is activated, all or substantially all of image light 34a through 34c is diffracted, the diffracted light emerging from ESHOE system 42 on the front surface as shown. Mirror 40 subsequently receives and reflects light 34 diffracted by ESHOE system 42. Light 34 reflected by mirror 40 is transmitted through and magnified by lens group 84 before being received by mirror 94. FIG. 6A shows beams 34a and 34c diverging to represent the magnification operation of lens group 84. Mirror 96 reflects magnified light 34 before it is received on a front surface of panel 22. Lens group 84, like lens group 86, magnifies the right component image light 34 to fit the front surface of panel 22. In this manner, a small image generated by image generator 22 may be expanded to fit a larger surface area of panel 22.

Figure 7:
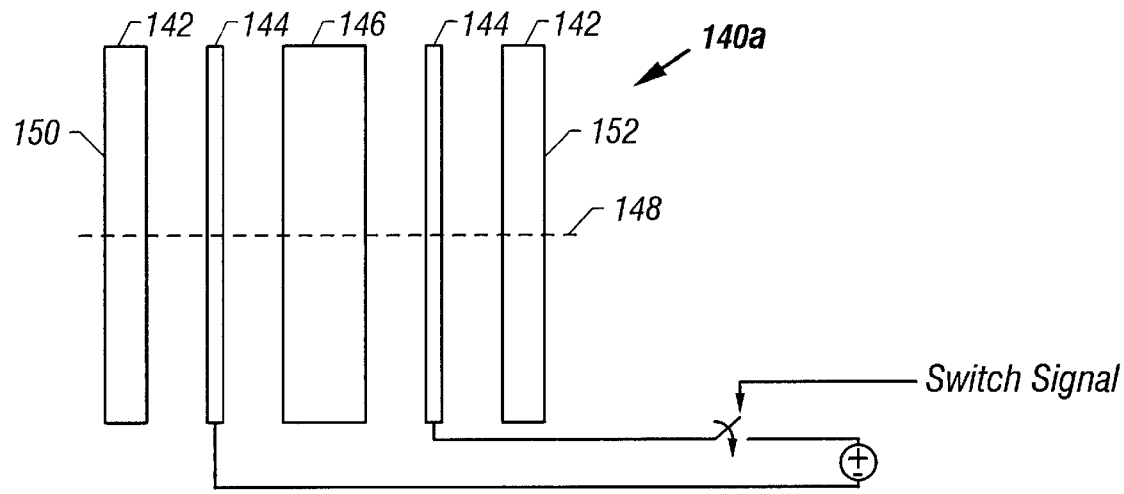
FIG. 7 shows one embodiment of an ESHOE employable in the optical system of FIGS. 1–6B.
Figure 8:
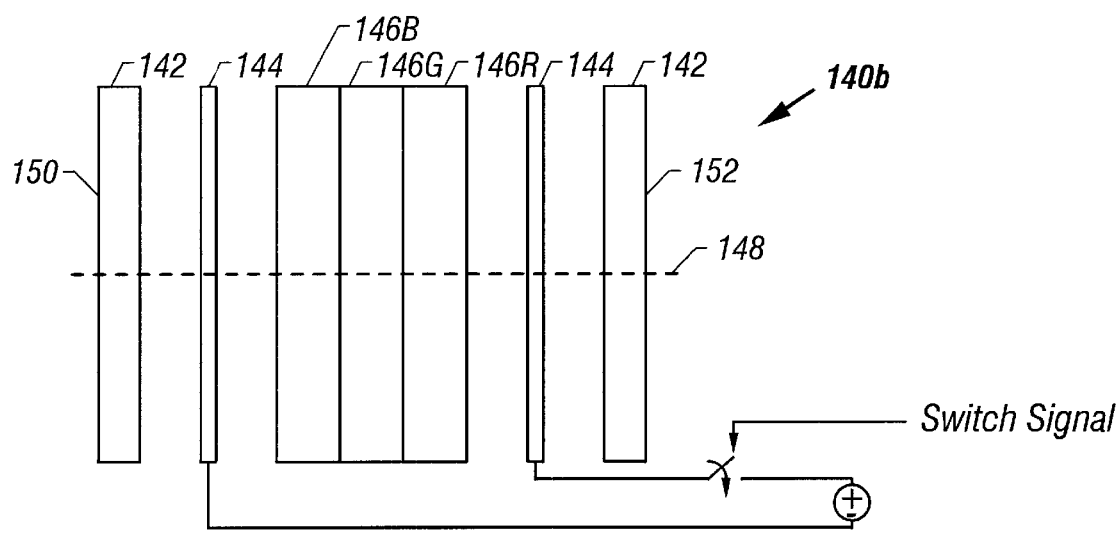
FIG. 8 shows an alternative embodiment of an ESHOE employable in the optical system of FIGS. 1–6B.

FIGS. 7 and 8 show alternative embodiments of ESHOEs 140A and 140B, respectively, which may be employed within the ESHOE system 42 described above. In one embodiment, ESHOE system 42 may include one or more ESHOEs 140A. In another embodiment ESHOE system 42 may include one or more ESHOEs 140B shown in FIG. 8. In still another embodiment, ESHOE system 42 may include a mix of ESHOEs 140A and 140B. Additionally, the conventional optical components described above, including mirrors 40, and 90–96, and optical components 100–122 of lens groups 82–84, may take form in one or more of the ESHOEs 140A and/or 140B.

ESHOE 140A or ESHOE 140B are shown in cross section and include a pair of light transparent and electrically nonconductive layers 142, light transparent and electrically conductive layers 144, and a switchable holographic layer or layers 146. It is noted that ESHOE is often defined as including layers 142 and 144 in addition to holographic layer 144. ESHOE should not be so limited. Rather, the term ESHOE may defined to include the holographic layer 146 by itself or a combination of the holographic layer 146 and ITO layers 144.

Switchable holographic layer 146 in ESHOEs 140A and/or 140B may be formed, in one embodiment, from a polymer dispersed liquid crystal material described in U.S. patent application Ser. No. 09/478,150 entitled Optical Filter Employing Holographic Optical Elements and Image Generating System Incorporating The Optical Filter, filed Jan. 5, 2000, U.S. patent application Ser. No. 9/533,120 entitled method and apparatus for illuminating a display, filed Mar. 23, 2000, or in U.S. Pat. No. 5,942,157 filed Jul. 12, 1996 and issued Aug. 24, 1999, all of which are incorporated herein by reference.

Holographic layer or layers 146 may undergo phase separation during a hologram recording process, thereby creating fringes which include regions densely populated by liquid crystal micro droplets interspersed with regions of clear polymer. Each holographic layer 146 preferably records a volume hologram, also known as thick or Bragg holograms. Thin phase holograms may also be employed. However, the use of Bragg holograms is preferred because they offer higher diffraction efficiencies for incident light whose wave length is close to the theoretical wave length satisfying the Bragg diffraction condition, and which is within a few degrees of the theoretical angle which also satisfies the Bragg diffraction condition. ESHOE 140A or 140B may be designed to operate as a specular reflector, i.e. with the Bragg fringes parallel to the surface of the holographic layer 146.

In one embodiment, the substantially transparent, electrically nonconductive layers 142 are formed from glass or plastic, while the substantially transparent electrically conductive layers 144 are formed from indium tin oxide (ITO). Layers 142 through 146 are arranged on a common optical axis 148 like a stack of pancakes between a front surface 150 and a back surface 152.

The holographic layer or layers 146 operate between active and inactive states depending upon whether an electric field is created in holographic layer or layers 146 with application of a voltage to ITO layers 144. In the active state, no voltage is applied to ITO layers 144, and each holographic layer 146 is capable of diffracting a narrow bandwidth of light incident thereon while transmitting the remaining bandwidths of incident light without substantial alteration. In the inactive state, ITO layers 144 are coupled to a voltage source of sufficient magnitude such that an electric field is established within holographic layer 146. The electric field changes the natural orientation of the liquid crystal droplets causing a refractive index modulation of fringes to reduce and the hologram diffraction efficiency within layer or layers 146 to drop it to a very low level, effectively erasing the hologram. In this inactive state, substantially all incident light is transmitted through holographic layer or layers 146 without substantial alteration.

As noted above, when active, each holographic layer 146 diffracts a narrow bandwidth of incident light in a predetermined manner. In the preferred embodiment, ESHOE 140A or 140B, when employed in ESHOE system 42, is configured as a reflective type device. As a reflective device, narrow bandwidth light incident on the front surface 150 is transmitted through layers 142 and 144 and subsequently diffracted by holographic layer or layers 146, the diffracted light emerging from front surface 150. In effect, each holographic layer 146, when active, behaves as a mirror to a narrow bandwidth of incident light. It is noted that in the active state each holographic layer 146 diffracts a narrow bandwidth of incident light while transmitting the remaining bandwidths of the incident light without substantial alteration.

ESHOE 140B shown in FIG. 8 is similar in structure to the ESHOE 140A shown in FIG. 7. More particularly, ESHOE 140B includes transparent and electrically nonconductive layers (e.g., glass or plastic) 142 and a pair of transparent and electrically conductive layers (e.g. ITO layers) 144. In contrast to ESHOE 140A, ESHOE 14B includes three distinct holographic layers 146B, 146G, 146R positioned between ITO layers 144. It is noted that fewer than or more than three layers of holographic layers 146 may be employed in ESHOE 140B.

In the embodiment of FIG. 8, when a voltage source is applied to ITO layers 144 via, for example, a switch signal provided by control circuit 16 to a switch coupled to a voltage source, all three holographical areas 146B through 146R operate in the inactive state and transmitt substantially all light incident thereon without substantial alteration. When the holograms in holographic layers 146B through 146R operate in the inactive state (e.g., when ITO layers are disconnected from the voltage source in accordance with a switch signal from control circuit 16), each of the holograms in holographic layers 146B through 146R may diffract the same or different bandwidths of light incident thereon. Preferably, where ESHOE 140B is employed in ESHOE system 42, each of the holograms in holographic layers 146B through 146R diffract different bandwidths of light incident thereon.

As noted above, ESHOE system 42 may include one or more ESHOEs 140A and/or 140B. Each hologram recorded in holographic layers 146 can be seen as being equivalent to a mirror that operates on a narrow bandwidth of light. Since the ITO layers 144 may introduce transmission losses it may be advantageous to construct ESHOE system 42 from three or more ESHOEs 140B which collectively include holographic layers 146 that diffract the full bandwidth of visual light incident thereon. Alternatively, ESHOE system 42 may be constructed from a ESHOE 140B extended to include, for example, six or more holographic layers 146 which collectively, when active, diffract the full bandwidth of visible light incident thereon. Whether several ESHOEs 140A or 140B are employed in ESHOE system 42 or whether one ESHOE 140B with many holographic layers (e.g., six layers or more) is employed in ESHOE system 42, in the preferred embodiment, each of the holographic layers 146 in ESHOE system diffracts a different wavelength of visible light such that a full visual bandwidth of image light 32 or 34 is reflected by ESHOE system 42 in the active state. For purposes of explanation, holographic layers 146B, 146G, 146R, in FIG. 8 are designed to diffract all of the red, green, and blue bandwidths, respectively, of visible light.

As noted above, components within lens groups 82 through 86, light deflector 40, and mirrors 90 through 96, may take form in one or more ESHOEs including ESHOE 140A or ESHOE 140B. The holograms recorded in holographic layer 146, when active, diffract incident light in a predetermined manner to perform one of many optical functions preformed by traditional optical elements such as lenses, mirrors, filters, prisms, etc. For example, a hologram recorded in holographic layer 146 may focus a narrow bandwidth of incident light thereon when active. Additionally, a hologram recorded in holographic layer 146 may be designed to disperse a narrow bandwidth of incident light thereon when active.

FIGS. 9 through 11 illustrate holographic layers performing optical functions on select bandwidths of incident light. FIG. 9 shows an ESHOE system 42 including holographic layers 146B, 146G, and 146R. The holographic layers shown in FIG. 9 may be positioned between the single pair of ITO layers of ESHOE 140B and thus simultaneously activated or deactivated in response to a voltage applied to the ITO layers. Alternatively, each of the holographic layers 146B through 146R shown in FIG. 9 may be contained within a respective ESHOE 140A. In this alternative embodiment, each ESHOE 146B, 146G, 146R shown in FIG. 9, is individually controllable.

FIG. 9 shows ESHOEs 146B through 146R simultaneously activated. In this configuration, activated ESHOE 146R diffracts a portion or all of the red bandwidth component of incident light 32 incident on surface 160. This diffracted component emerges from activated ESHOE 146R as diffracted light 32R. The remaining components of incident light 32 pass through activated ESHOE 146 and fall incident on ESHOE 146G. Activated Shoe 160G, in response, diffracts some or all of the green bandwidth portion of incident light thereon. This diffracted light emerges from activated ESHOE 146G as diffracted light 32G. The remaining components of light 32 incident on ESHOE 146G pass therethrough substantially unaltered and fall incident upon surface 160B of activated ESHOE 146B. Some or all of the blue bandwidth portion of light incident on ESHOE 146B is diffracted to emerge from surface 160B as diffracted light 32B. ESHOE 146R may be replaced by two or more ESHOEs each one of which is designed to diffract a different bandwidth of the red visible light component, SHOE 146G may be replaced by two or more ESHOEs each one of which is designed to diffract different components of green visible bandwidth light, and SHOE 146B may be replaced by two or more ESHOEs each of which are designed to diffract different bandwidths of blue visible light. In this manner, all or substantially all of the visible light 32 incident on ESHOEs 146R through 146G can be diffracted.

FIGS. 10 and 11 illustrate operational aspects of ESHOE systems 160 and 162, respectively, which include a collection of ESHOEs 146B through 146R collectively operating similar to conventional lens. In FIGS. 10 and 11, ESHOEs 146B through 146R operate to focus incident light image 32a and 32B. More particularly, ESHOE system 160 shown in FIG. 10 operates like a conventional diverging lens when ESHOEs 146B through 146R are simultaneously activated. In contrast, ESHOE system 162 shown in FIG. 11 acts similar to a conventional converging lens when the collection of ESHOEs 146B through 146R are activated. ESHOE systems 160 and/or 162 could be used in the lens groups 82, 84, and/or 86. Although not shown, the use of an additional group of three holographic optical elements (static or electrically switchable) or other diffractive optical elements can be employed to correct chromatic dispersions and other aberrations introduced by ESHOEs 146B through 146R. More particularly, each of the three additional holographic optical elements would correct color dispersion introduced by a respective one of the ESHOEs 146B through 146R. The color dispersion arises with respect to non-monochromatic light.

The ESHOEs shown in FIGS. 10 and 11 are transmisive type in contrast to the ESHOEs 146B through 146R shown in FIG. 9 which are reflective type. First order diffracted light emerges from the surface of transmissive type ESHOEs opposite the surface which receives light to be diffracted. In contrast, first order diffracted light emerges from the same surface of reflective type ESHOEs which receives light to be diffracted.

Although the present invention have been described in connection with several embodiments, the invention is not intended to be limited to the specific forms set forth herein, but on the contrary, it is intended to cover such alternatives, modifications, and equivalents as can be reasonably included with in the spirit and scope of the invention as defined by the appended claims.

What is claimed is:

1. An apparatus comprising:
a first electrically switchable holographic optical element (ESHOE) comprising oppositely facing front and back surfaces, wherein the first ESHOE is configured to receive first bandwidth light on the front surface thereof, wherein the first ESHOE operates between active and the inactive states, wherein the first ESHOE transmits first bandwidth light received on the front surface thereof without substantial alteration when operating in the inactive state, wherein the first ESHOE diffracts first bandwidth light received on the front surface thereof when operating in the active state, wherein first bandwidth light received and diffracted by the first ESHOE emerges from the front surface;
a light deflector configured to receive first bandwidth light diffracted by the first ESHOE, wherein the light deflector is configured to deflect first bandwidth light diffracted by the first ESHOE;
wherein first bandwidth light transmitted through the inactive first ESHOE without substantial alteration is configured to illuminate a first surface area, and wherein first bandwidth light diffracted by the active first ESHOE and subsequently deflected by the light deflector is configured to illuminate a second surface area, wherein the first surface area is adjacent to the second surface area.

2. The apparatus of claim 1 further comprising an image generator for generating image light, wherein image light generated by the image generator is subsequently received by the front surface of the first ESHOE.

3. The apparatus of claim 2 wherein the image generator is configured to generate first and second light components of a composite image, wherein the second light component is generated subsequent to the generation of the first light component.

4. The apparatus of claim 3 wherein the first ESHOE operates in the inactive state when the first ESHOE receives the first light component generated by the image generator, and wherein the first ESHOE operates in the active state when the first ESHOE receives the second light component generated by the image generator.

5. The apparatus of claim 4 further comprising a display screen, wherein the display screen comprises first and second screen portions, wherein the first and second screen portions comprise the first and second surfaces areas, respectively.

6. The apparatus of claim 5 wherein the light deflector device comprises a mirror.

7. The apparatus of claim 5 wherein the light deflector comprises a holographic optical element configured to diffract light received on a front surface thereof, wherein light diffracted by the holographic optical element emerges from the front surface thereof.

8. The apparatus of claim 1 further comprising:
a first optical component for magnifying light, wherein the first optical component is in optical communication with the first ESHOE and;
a second optical component for magnifying light, wherein the second optical component is in optical communication with the light deflector.

9. The apparatus of claim 1 wherein the first ESHOE comprises a holographic recording medium that records a hologram, wherein the holographic recording medium comprises:
a monomer dipentaerythritol hydroxypentaacrylate;
a liquid crystal;
a cross-linking monomer;
a coinitiator; and
a photoinitiator dye.

10. The apparatus of claim 1 wherein the first ESHOE comprises a hologram made by exposing an interference pattern inside a polymer-dispersed liquid crystal material, the polymer-dispersed liquid crystal material comprising, before exposure:
a polymerizable monomer;
a liquid crystal;
a cross-linking monomer;
a coinitiator; and
a photoinitiator dye.

11. The apparatus of claim 1 further comprising:
a second ESHOE in optical communication with the first ESHOE, wherein the second ESHOE comprises oppositely facing front and back surfaces, wherein the second ESHOE is configured to receive second bandwidth light on the front surface thereof, wherein the second ESHOE operates between active and the inactive states, wherein the second ESHOE transmits second bandwidth light received on the front surface thereof without substantial alteration when operating in the inactive state, wherein the first ESHOE diffracts second bandwidth light received on the front surface thereof when operating in the active state, wherein second bandwidth light received and diffracted by the second ESHOE emerges from the front surface thereof;
wherein the light deflector is configured to receive second bandwidth light diffracted by the second ESHOE, wherein the light deflector is configured to deflect second bandwidth light diffracted by the second ESHOE;
wherein second bandwidth light transmitted through the inactive second ESHOE without substantial alteration is configured to illuminate the first surface area, and wherein second bandwidth light diffracted by the active second ESHOE and subsequently deflected by the light deflector is configured to illuminate the second surface area, wherein the first bandwidth light is different from the second bandwidth light.

12. The apparatus of claim 11 further comprising:
a third ESHOE in optical communication with the first and second ESHOEs, wherein the third ESHOE comprises oppositely facing front and back surfaces, wherein the third ESHOE is configured to receive third bandwidth light on the front surface thereof, wherein the third ESHOE operates between active and the inactive states, wherein the third ESHOE transmits third bandwidth light received on the front surface thereof without substantial alteration when operating in the inactive state, wherein the first ESHOE diffracts third bandwidth light received on the front surface thereof when operating in the active state, wherein third bandwidth light received and diffracted by the third ESHOE emerges from the front surface thereof;
wherein the light deflector is configured to receive third bandwidth light diffracted by the third ESHOE, wherein the light deflector is configured to deflect third bandwidth light diffracted by the second ESHOE;
wherein third bandwidth light transmitted through the inactive third ESHOE without substantial alteration is configured to illuminate the first surface area, and wherein third bandwidth light diffracted by the active third ESHOE and subsequently deflected by the light deflector is configured to illuminate the second surface area, wherein first, second, and third bandwidth lights are different from each other.

13. An apparatus comprising:
- an image generator that projects image segments of a composite image in a predetermined direction;
- a display screen in optical communication with said image generator to receive and visually display said image segments projected from said image generator; and
- projection optics positioned between said image generator and said display screen to selectively direct said image segments to different sections of said display screen to form said composite image on said display screen, said projection optics comprising a first reflective-type reconfigurable holographic optical element having an optical characteristic that is controllable by an electrical field applied thereto, said first reflective-type reconfigurable holographic optical element being holographically configured to diffract one of the image segments to one of said different sections of said display screen when in a diffractive state.

14. The apparatus of claim 13 wherein said first reflective-type reconfigurable holographic optical element of said projection optics is further holographically configured to magnify said one image segment by a defined power when said particular image segment is diffracted by said first reflective-type reconfigurable holographic optical element.

15. The system of claim 13 wherein said projection optics further comprises a second reflective-type reconfigurable holographic optical element, wherein said second reflective-type reconfigurable holographic optical element is holographically configured to correct aberrations introduced by said first reflective-type reconfigurable holographic optical element, wherein said second reflective-type reconfigurable holographic optical element has a controllable optical characteristic that is responsive to a second applied electrical field.

16. The apparatus of claim 13 wherein said first reflective-type reconfigurable holographic optical element is one of a plurality of reflective-type reconfigurable holographic optical elements included in said projection optics, each of said reflective-type reconfigurable holographic optical elements being holographically configured to diffract a respective one of said image segments to a respective one of said different sections of said display screen.

17. An apparatus comprising:
- an image forming device for projecting an image;
- a display screen comprising first and second display panels for visually displaying images projected by the image forming device;
- a switchable holographic device configured to receive the projected image, wherein the switchable holographic device is switchable between active and inactive states, wherein the switchable holographic device is configured to deflect the projected image when active, and wherein the switchable holographic device is configured to transmit the projected image onto the first display panel when inactive;
- a light deflector configured to receive the projected image deflected by the switchable holographic device, wherein the light deflector is configured to deflect the projected image deflected by the switchable holographic device onto the second display panel.

18. The apparatus of claim 17 wherein the switchable holographic device comprises holographically recorded interference fringes that at least partially define an optical characteristic of said switchable holographic device.

19. The apparatus of claim 18 wherein the image forming device is configured to project first and second components of a composite image, wherein the second component is generated subsequent to the generation of the first light component, and wherein the second component is generated as the switchable holographic device operates in the active state, and wherein the first component is generated as the switchable holographic device operates in the inactive state.

20. The apparatus of claim 17 wherein the switchable holographic device comprises first, second, and third switchable holograms each of which is switchable between active and inactive states, wherein the first, second, and third switchable holograms, when active, are configured to diffract first, second, and third bandwidth light components, respectively, of the projected image received by the switchable holographic device, and wherein the first, second, and third switchable holograms, when inactive, are configured to pass the first, second, and third bandwidth light components of the projected image received by the switchable holographic device without substantial diffraction.

21. The apparatus of claim 17 further comprising a lens optically positioned between the switchable holographic device and the first display panel, wherein the lens is configured to magnify the projected image transmitted through the switchable holographic device.

22. The apparatus of claim 17 wherein switchable holographic device is configured to switch between the active and inactive states in less than 150 microseconds.

* * * * *